United States Patent
Fu et al.

(10) Patent No.: US 7,207,279 B2
(45) Date of Patent: Apr. 24, 2007

(54) BUCKLING UP PHALANGES JOINTS TYPE BUTTON INPUT DEVICE

(76) Inventors: Mao-Jung Fu, F4, No. 1, Alley 4, Lane 291, Sec. 1, Shuiyuan Rd., Hsichih City, Taipei Hsien (TW); Maw-Yaw Fuh, 7F, No. 7, Alley 21, Lane 21, Lane 332, Sec. 2, Tanhsing Rd., Tanzih Hsiang, Taichung Hsien (TW)

( * ) Notice: Subject to any disclaimer, the term of this patent is extended or adjusted under 35 U.S.C. 154(b) by 202 days.

(21) Appl. No.: 11/004,685

(22) Filed: Dec. 3, 2004

(65) Prior Publication Data

US 2006/0010940 A1    Jan. 19, 2006

(30) Foreign Application Priority Data

Jul. 15, 2004    (TW) ................. 93121104 A

(51) Int. Cl.
*E05G 5/00*    (2006.01)
*E05B 75/00*    (2006.01)

(52) U.S. Cl. .............................. 109/3; 70/16

(58) Field of Classification Search .............. 70/1.5, 70/15, 16, 17, 209, 63; 109/24.1, 22, 3, 4, 109/45, 49.5; 340/5.51, 5.54, 5.85, 5.3, 5.31; 341/22; 43/59, 60; 49/60; 296/1.04–1.05; 292/DIG. 22, 183–184

See application file for complete search history.

(56) References Cited

U.S. PATENT DOCUMENTS

| 3,736,779 | A | * | 6/1973 | Pratt | 70/276 |
| 4,972,784 | A | * | 11/1990 | Ing-Hsiang | 109/3 |
| 5,117,223 | A | * | 5/1992 | Tanner | 340/693.5 |
| 5,673,575 | A | * | 10/1997 | Carlo et al. | 70/209 |
| 6,184,804 | B1 | * | 2/2001 | Harrison | 341/22 |

* cited by examiner

*Primary Examiner*—Brian E. Glessner
*Assistant Examiner*—Alyson M. Merlio
(74) *Attorney, Agent, or Firm*—patenttm.us; James H. Walters

(57) ABSTRACT

A buckling up phalanges joints type button input device and method use features that the phalanges joints can bend. A curved surface button input panel is installed inside sheathing. A curved surface mobile panel is installed corresponding to a curved surface of the button input panel, so as to form a curved space between the button input panel and the mobile panel. Fingers can stretch inside the curved space to operate buttons following an angle of the curved space. When either the curved surface mobile panel or the button input panel move, the curved space will become narrowed or extended. Once the curved space become narrowed, the phalanges joints will be locked on a turning point of the curved space due to a length of the fingers, so that the fingers cannot draw out. Thereby the phalanges joints will be locked if error data is inputted.

19 Claims, 7 Drawing Sheets

BUCKLING UP PHALANGES JOINTS TYPE BUTTON INPUT DEVICE

BACKGROUND OF THE INVENTION

1. Field of the Invention

The invention relates in general to a button input device, and more particularly to a buckling up phalanges joints type button input device and method, wherein when a user inputs error data, the user's phalanges joints will be locked by the device.

2. Description of the Related Art

Conventional button input devices do not include a function of buckling up phalanges joints, and also the button input devices are of exposed type. Everyone can directly input data and operate the conventional button input devices. Even if the input data is not correct after comparison, an alert system to prevent invasion will not start, nor do the devices lock an invader's fingers. Thereby the present invention can lock the invader's phalanges joints, which is an advanced and improved device for the conventional button input devices.

SUMMARY OF THE INVENTION

An objective of enhancing a security system to prevent from an intrusion, a novel idea to highlight a button input device of a design of a buckling up phalanges joints type button input device of the present invention is provided. People used to consume a lot of energy and money to prevent from the intrusion of breaking identification data in the past, so as to result in a higher and higher cost of software and hardware equipment successively. Thereby the present invention provides the buckling up phalanges joints type button input device, which can lock an invader's phalanges joints when the invader desires to break through the security system and inputs wrong password with fingers, so that the invader cannot run away.

A main objective of the present invention of the buckling up phalanges joints type button input device is to enhance a deterrent effect, promote the security of an intrusion detection system, so as to frighten the invaders. In addition, a secondary objective of the present invention of the buckling up phalanges joints type button input device is to reduce the cost of the intrusion detection system.

The present invention of the buckling up phalanges joints type button input device does not use a key. Memory data is inputted by buttons to the buckling up phalanges joints type button input device, so as to start the intrusion detection system. In comparison with the conventional button input device, the present invention includes novelty as follows. Firstly, the present invention includes a function of auto-catch invaders, so as to greatly enhance the security of the intrusion detection system. Secondly, the cost of the intrusion detection system is largely reduced. Third, a curved surface button input panel is installed inside a hidden curved space, so that a button input faceplate can be protected to avoid damaging. Fourth, the password is not easy to be stolen such as fingerprints or microchip. And Fifth, the buckling up phalanges joints type button input device is installed on a door plank, so that the present invention can further be used as a doorknob.

DETAILED DESCRIPTION OF THE INVENTION

An appearance and a structure of the present invention of the buckling up phalanges joints type button input device is illustrated with structure diagrams as follows. A further detailed instruction of the present invention and a method will be described. FIG. 1 to FIG. 3 and FIG. 4 to FIG. 6 show two preferred embodiments of the present invention respectively. FIG. 7 shows a flow chart diagram. A motor-driven mobile panel 50 and a manual-driven mobile panel 50 are stated separately as follows.

Figure 1:
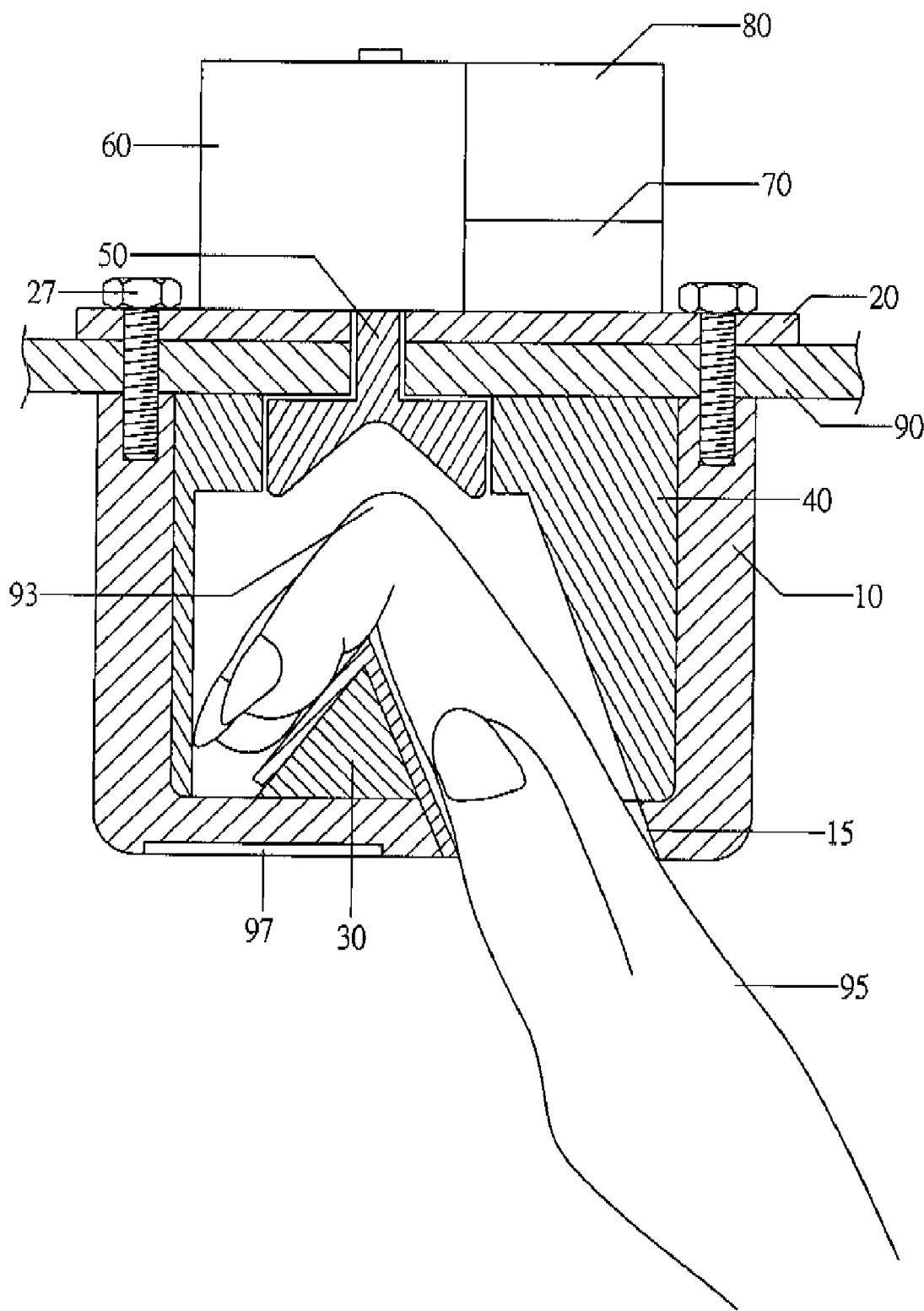
FIG. 1 shows a top view structure diagram of the present invention.
Figure 2:
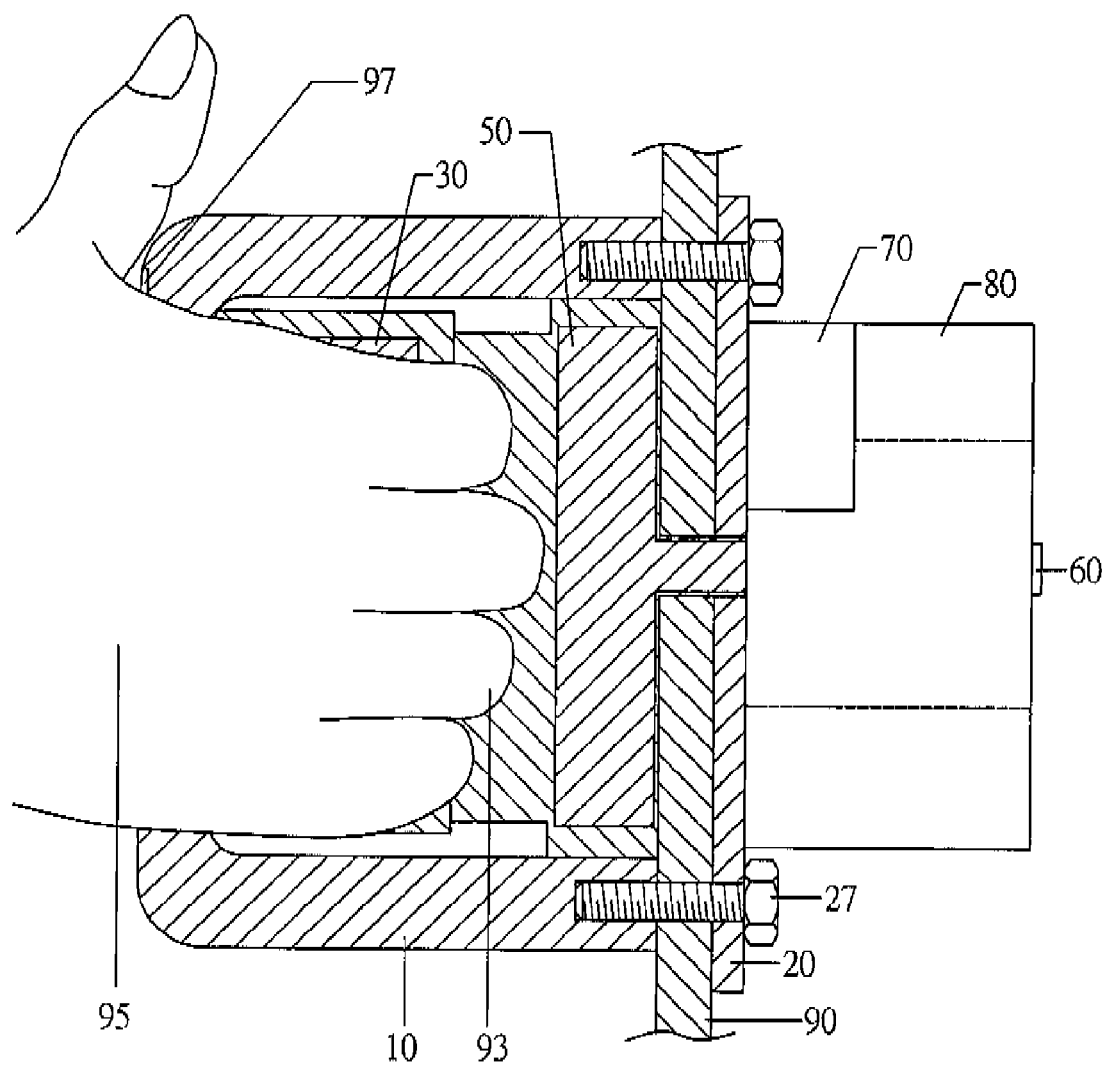
FIG. 2 shows a lateral view structure diagram of the present invention.
Figure 3:
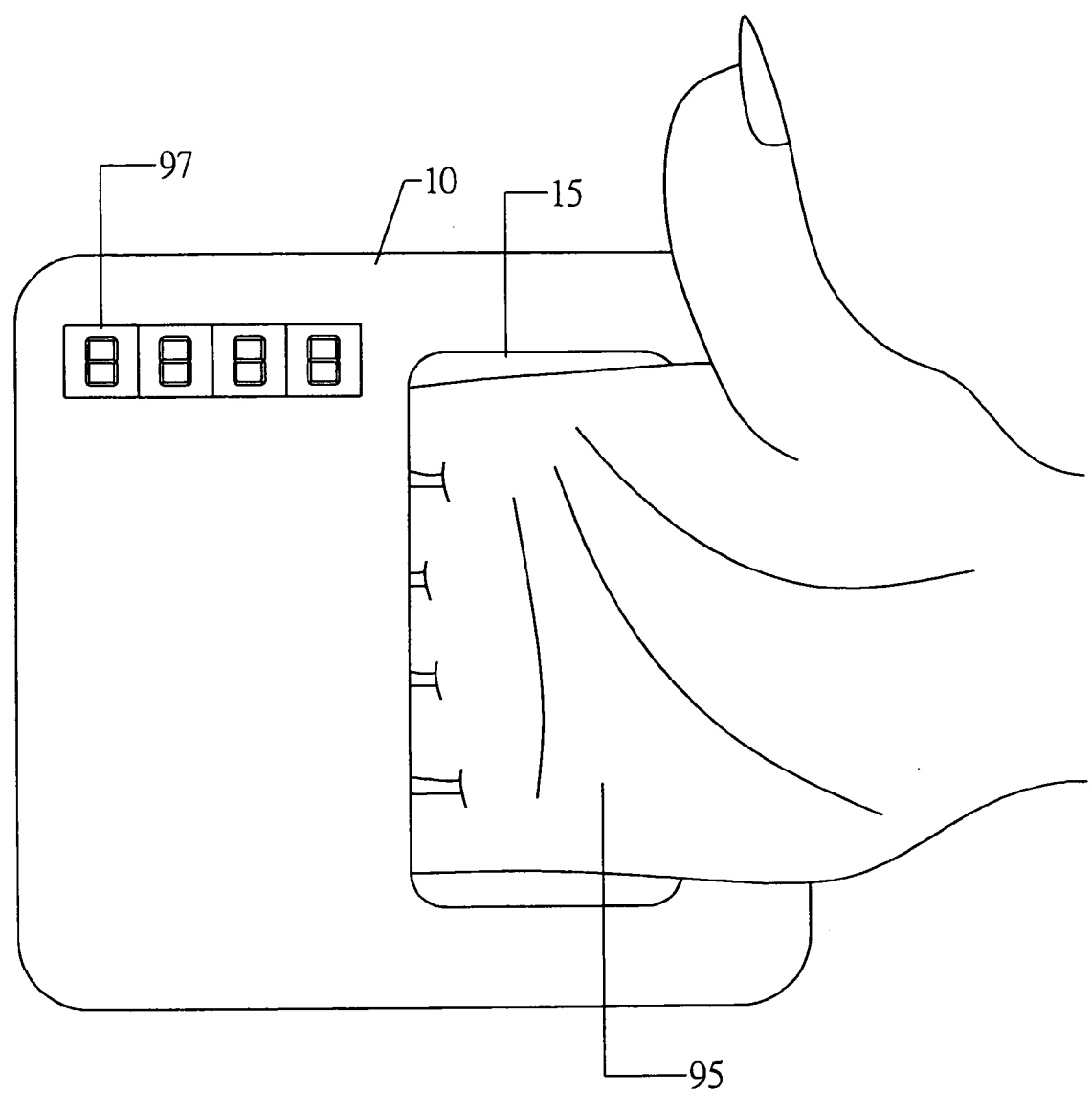
FIG. 3 shows a front view structure diagram of the present invention.

A first preferred embodiment of the present invention is provided with reference to the appearance and structure diagrams of FIG. 1 to FIG. 3. FIG. 1 shows a top view structure diagram of the buckling up phalanges joints type button input device. The device has a sheathing 10 and a fixed component 27 for an integration hole provided on a back peripheral of the sheathing 10. The fixed component 27 refers to a component to integrate and fix different parts or units, such as a screw, a rivet and the like. An opening 15 for finger(s) to stretch inside is provided on the sheathing 10, and a digital display 97 is fitted in the sheathing 10 and next to the opening 15 for a user to read whether input data is correct or not. Another opening (not shown) for the fingers to stretch inside may be above a baseboard 20, so as to fit different embedded installation manners. This preferred embodiment of the present invention is an exterior part installation. A quantity and position of a screw plurality of screw holes for the fixed components 27 correspond to the screw holes on the sheathing 10. Moreover, a door plank 90 is mounted between the baseboard 20 and the sheathing 10 integrated by the fixed component 27. A data processing control unit 80, a movement-detecting unit 70 and a motor drive unit 60 are installed on the baseboard 20. Further, a sliding outlet frame 40 is installed on two external sides of the sheathing 10 to provide accommodation for a mobile panel 50 to move forward and backward in. When using the device, the mobile panel 50 having a curved surface is at an initial position to keep a regular width in the beginning, so that the user's fingers can stretch forward to operate a button input panel 30. The button input panel also has a curved surface. When a password is inputted, no matter the input data is correct or not, the motor drive unit 60 will push the mobile panel 50 forward to a predetermined setting position. In this way, the user's phalanges joints 93 are clamped at a turning point of the button input panel 30 and the mobile panel 50. If the user inputs the correct password, the mobile panel 50 moves backward to the initial position at once. Meanwhile, the data processing control unit 80 sends an unlock signal to an intrusion detection system. On the contrary, if the wrong password is inputted, the fingers 93 will be arrested by the mobile panel. Whether the mobile panel 50 will reach the predetermined setting position is decided by an analysis result of the data processing control unit 80 that the movement-detecting unit 70 transmits detected data to the data processing control unit 80, and then notifies the motor drive unit 60 to stop working. The user will find it is impossible to push back the forwarded mobile panel 50 since the motor drive unit 60 is operated by a power-driven motor to drive a lead screw to rotate, so as to convey displacement kinetic energy to the mobile panel 50 to move. Thus the mobile panel 50 cannot move backward without opposite rotation. Once the user inputs the wrong password, the device will not process any other input data. On the contrary, an action to lock the phalanges joints 93 will be executed, and the device is temporarily rendered inoperable.

Referring to FIG. 2, a lateral view structure diagram of the buckling up phalanges joints type button input device of the present invention is shown. The user's palm 95 extends into the device. In order to operate buttons on the button input panel 30, the phalanges joints 93 of the palm 95 must bend to follow a curved passage formed by the button input panel 30 and the mobile panel 50.

Referring to FIG. 3, a front view of the present invention is shown. The whole palm 95 is extended into the opening 15 of the sheathing 10. The digital display 97 is next to the opening 15 for the palm 95.

Figure 4:
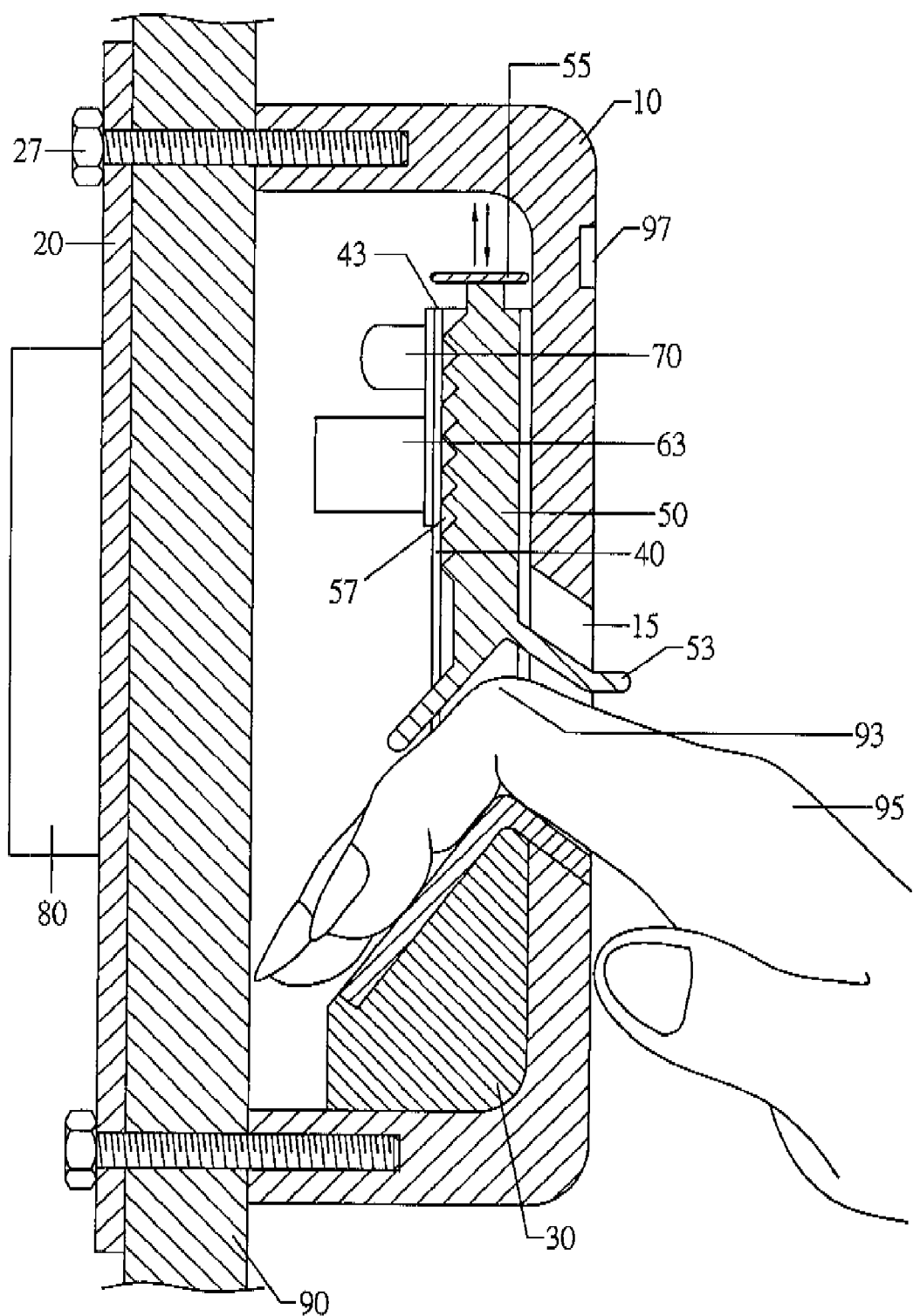
FIG. 4 shows another lateral view structure diagram of the present invention.
Figure 5:
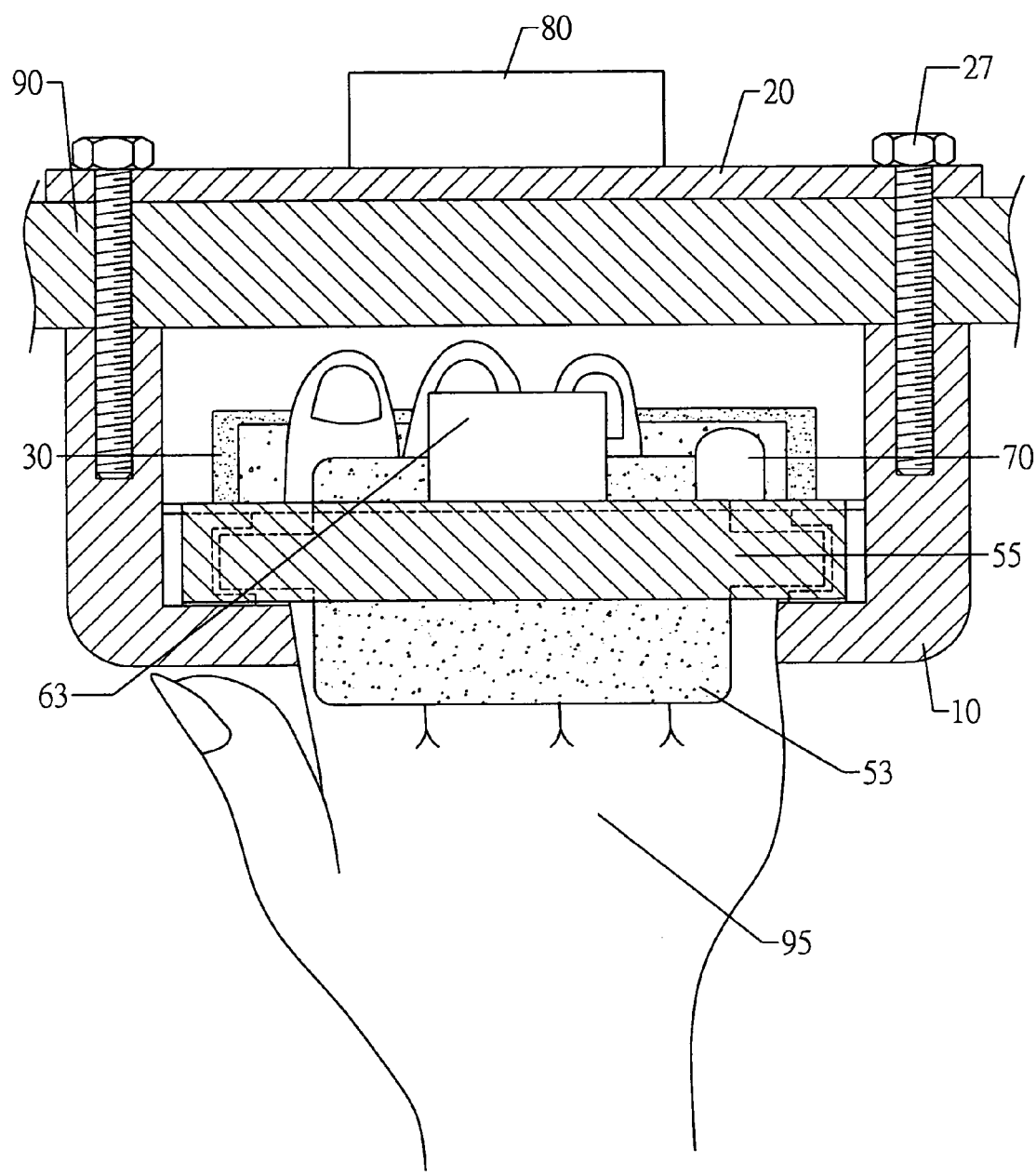
FIG. 5 shows another top view structure diagram of the present invention.
Figure 6:
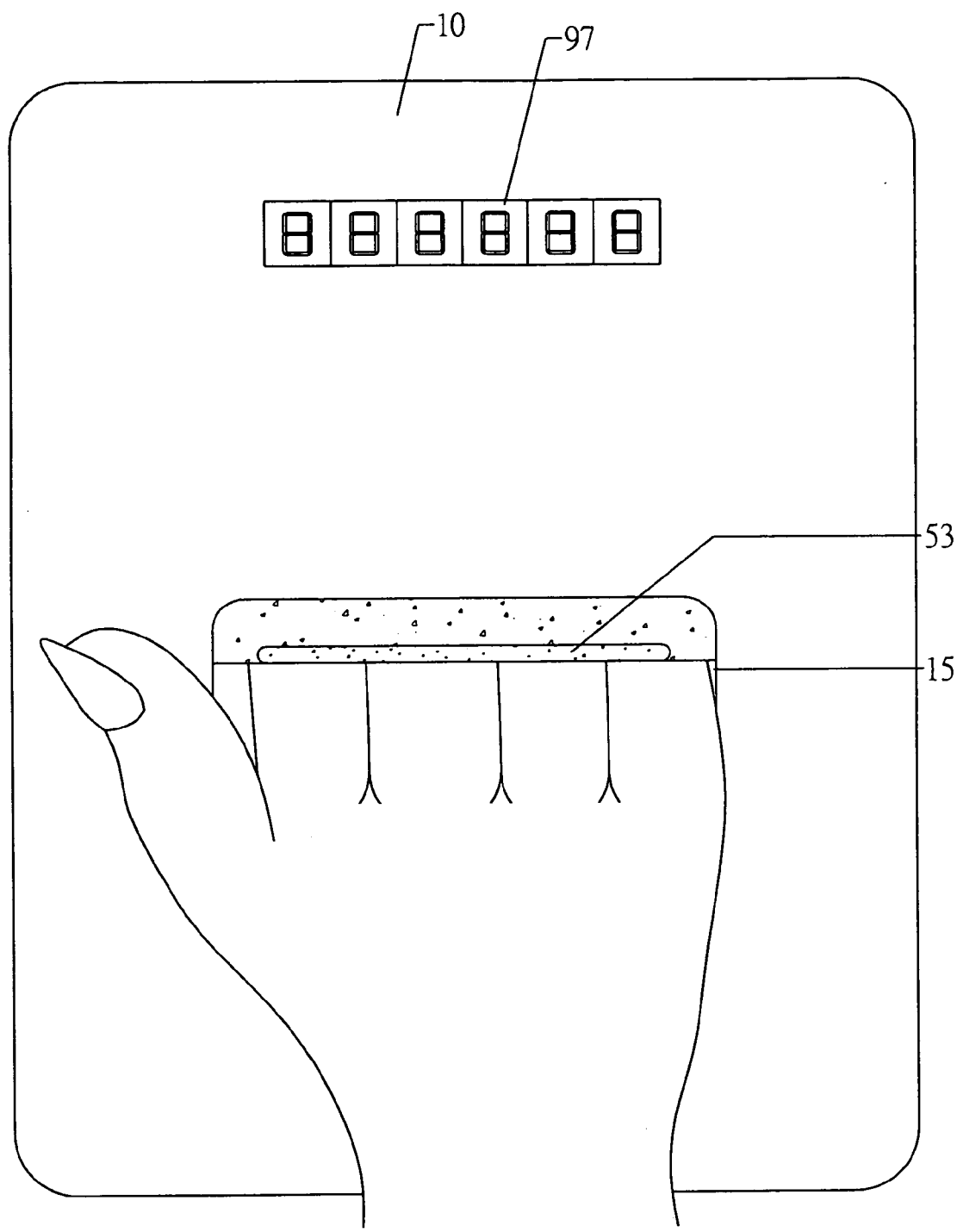
FIG. 6 shows another front view structure diagram of the present invention.
Figure 7:
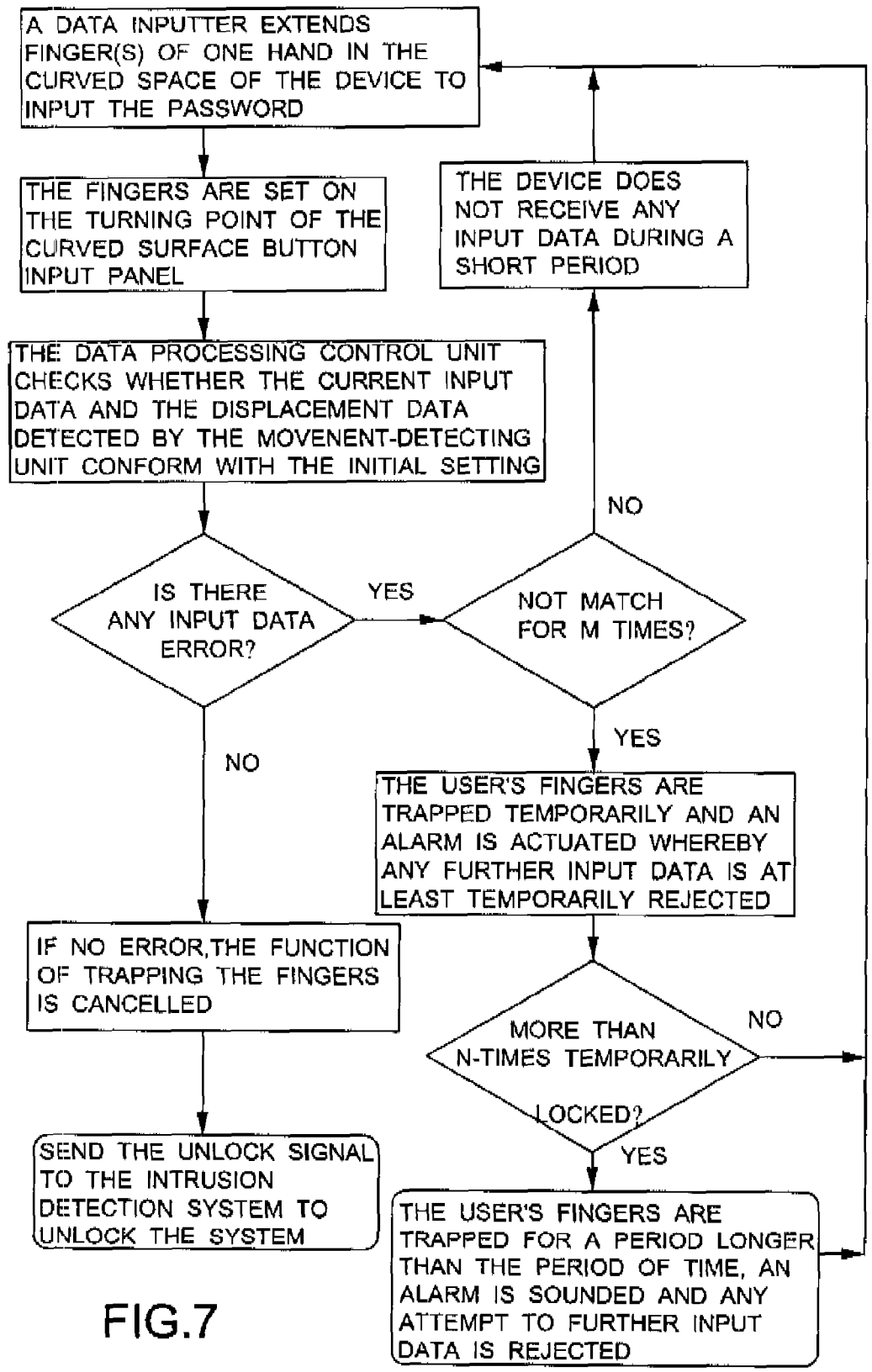
FIG. 7 shows a flow chart diagram of the present invention.

Furthermore, a second preferred embodiment of the present invention is provided with reference to the appearance and structure diagrams of FIG. 4 to FIG. 6. FIG. 4 shows another lateral view structure diagram of the buckling up phalanges joints type button input device. A mobile panel 50 is moved manually. The sheathing 10 defines an opening 15 for fingers to extend inside. A digital display 97 is fitted next to the opening 15 for a user to read whether input data is correct or not. A baseboard has a plurality of fixed component 27 for respectively mating with a plurality of integration holes defined in a back periphery of the sheathing 10. Another opening for the fingers to extend inside may be defined above a baseboard 20, so as to suit different embedded installation manners. This preferred embodiment of the present invention is an exterior part installation. Moreover, a door plank 90 is sandwiched by the baseboard 20 and the sheathing 10 integrated by the fixed component 27. A data processing control unit 80 is installed on the baseboard 20. Further, a sliding outlet frame 40 is installed above the opening 15 of the sheathing 10 to provide a passage for the mobile panel 50 to move along forward and backward. Since the preferred embodiment of the present invention is operated manually to move the mobile panel 50, when the device is not in use, the mobile panel 50 moves downward due to the effect of the gravity. The mobile panel 50 will stop descending when touching a lower limit board 55 to reach an upper frame of a sliding outlet frame 43. Moreover, a side of a flange 53 of the curved surface mobile panel 50 is exposed to the opening 15. When using the device, a user's fingers can stretch inside a curved space formed by a button input panel 30 and the mobile panel 50 by raising the flange 53 manually, so that the phalanges joints 93 will be trapped at a turning point of the curved space. In addition, compressing or expanding curved surfaces will change a width of the curved space. The button input panel 30 is also installed inside the sheathing 10, which is opposite to the mobile panel 50 at a lower position. A brake 63 is mounted on a surface of the sliding outlet frame 40. The brake 63 can restrain the mobile panel 50 from moving on the sliding outlet frame 40 due to a plurality of saw teeth outlets at the back of the mobile panel 50. When the brake 63 receives signals from the data processing control unit 80 to operate, the brake 63 will lock the saw teeth outlets 57, so that the mobile panel 50 cannot move. Successively the fingers of the user's palm 95 are extended in the curved space formed by the button input panel 30 and the mobile panel to operate the button input panel 30. When a password is inputted, the mobile panel 50 is set at a predetermined position, and meanwhile a movement-detecting unit 70 will transmit position data of the mobile panel 50 to the data processing control unit 80 for comparison. At this moment, if any violation of operation procedure occurs, an action to trap the phalanges joints 93 will be executed instead of processing any input data, and the device cannot be operated within a short time.

Referring to FIG. 5, another top view of the present invention is shown. The palm 95 is extended into the device. The flange 53 protrudes from the sheathing 10 and is above the palm 95. The flange 53 can be moved downward manually or can be pushed downward.

Referring to FIG. 6, another front view of the present invention is shown. The palm 95 is extended into the opening 15. The flange 53 presses the palm 95. A digital display 97 is fitted at an upper part of the sheathing 10.

A method of operating the device is described as follows. Referring to FIG. 1 again, the device can be alternatively powered by an AC (alternating current) or a DC (direct current). An electric current goes through the button input panel 30, the motor drive unit 60, the brake 63, the data processing control unit 80 and the digital display 97. Since the phalanges have lengths and the phalanges joints 93 are able to bend, the fingers can be trapped at a turning point of the curved space formed between the button input panel 30 and the mobile panel 50. In this way, the palm 95 cannot be drawn out and the fingers are trapped. The device replaces the conventional external exposed flat button input panel by using a hidden and button input panel 30. The curved surface can be of "V" shape or of "⊓" shape, so as to meet the contour of bent fingers. Moreover, the mobile panel 50 is also installed facing the button input panel 30, so as to form the curved space therebetween. Displacement of either of the curved surfaces can reduce or enlarge the curved space. In addition, a displacement motive force of the mobile panel 50 can be natural gravity or mechanical force, such as pneumatic pressure, a hydraulic pressure, a spring force, a motor and the like.

Setting of the buckling up phalanges joints type button input device of the present invention will be illustrated as follows. Before using the device, password information must be priorly set for the data processing control unit 80, so as to provide as an authentication to unlock the intrusion detection system. The user's phalanges joints 93 are set on the turning point of the curved surface button input panel 30, and then the mobile panel 50 is set to press down on the phalanges joints 93. At this moment, the movement-detecting unit 70 detects the displacement data of the mobile panel 50 and sends the displacement data to the data processing control unit 80 to be saved. The predetermined password and the displacement data by which the mobile panel 50 locks the phalanges joints 93 in advance are both saved in the data processing control unit 80, so as to provide as the authentication to unlock the intrusion detection system later. Finally an output terminal of the data processing control unit 80 is connected to the intrusion detection system, such as an electric door lock or an engine switch, a private mailbox and so forth. When using the device formally, the user inputs the correct password and the phalanges joints 93 are put at the set initial position. If correct, the data processing control unit 80 will send an unlock signal to the intrusion detection system. On the contrary, if any input data is wrong, the data processing control unit 80 will render the mobile panel 50 motionless, and the user's fingers will be locked in the device temporarily. Meanwhile, the device will not accept any input data while the phalanges joints 93 are trapped in the device. While attempting to input data for several times later, the device will lock the user's fingers for a long time.

Referring to FIG. 7, a workflow diagram of the present invention is shown.

In conclusion, the present invention contributes to the trapping of fingers of an inputter who keys-in either fraudulent or incorrect information. Therefore, the present invention exactly comprises utility and conforms to novelty non-obviousness and inventive step of requirements of a patent.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A buckling up phalanges joints type button input device comprising:
   a sheathing defined with an opening that allows a single finger or a plurality of fingers to stretch into the device;
   a baseboard;
   a button input panel having a curved surface;
   a sliding outlet frame;
   a mobile panel having a curved surface facing the curved surface on the button input panel;
   a lower limit board;
   a motor drive unit;
   a movement-detecting unit; and
   a data processing control unit.

2. The device as claimed in claim 1, further comprising a digital display mounted on the sheathing, wherein the sheathing has
   a back; and
   a screw hole formed on the back of but not through the sheathing peripherally, to hold a mechanical screw.

3. The device as claimed in claim 1, wherein multiple buttons are mounted on the curved surface of the button input panel; and
   the curved surface of the button input panel can be "V" shaped or "⊓" shaped.

4. The device as claimed in claim 1, wherein the sliding outlet frame only allows the mobile panel to move forward and backward.

5. The device as claimed in claim 1, wherein the curved surface of the mobile panel can be "V" shaped or "⊓" shaped.

6. A buckling up phalanges joints type button input device comprising:
   a sheathing,
   a baseboard,
   a curved surface button input panel,
   a sliding outlet frame,
   a curved surface mobile panel,
   a lower limit board,
   a motor drive unit,
   a brake,
   a movement-detecting unit, and
   a data processing control unit,
   wherein the curved surface mobile panel and the curved surfaces button input panel are installed with the corresponding surface facing against each other.

7. The device as claimed in claim 1, wherein the lower limit board maintains an appropriate space between the mobile panel and the button input panel.

8. The device as claimed in claim 1, wherein the motor drive unit provides power to the mobile panel.

9. The device as claimed in claim 1, wherein the movement-detecting unit detects a movement status of the curved surface mobile panel.

10. The device as claimed in claim 1, wherein the data processing control unit executes tasks of setting, receiving, comparing, analyzing and controlling a password and a sensed signal.

11. A buckling up phalanges joints type button input device comprising:
    a sheathing having a front wall with an opening that allows a single finger or multiple fingers to extend into the device;
    a baseboard;
    a button input panel having a curved surface;
    a sliding outlet frame;
    a mobile panel having a curved surface facing the curved surface on the button input panel;
    a lower limit board;
    a brake;
    a movement-detecting unit; and
    a data processing control unit.

12. The device as claimed in claim 11 further comprising a digital display mounted on the sheathing, wherein the sheathing has
    a back; and
    a screw hole defined peripherally on the back of but not through the sheathing to hold a mechanical screw.

13. The device as claimed in claim 11, wherein multiple buttons are mounted on the curved surface of the button input panel; and
    the curved surface of the button input panel can be "V" shaped or "⊓" shaped.

14. The device as claimed in claim 11, wherein the sliding outlet frame is longitudinally extending from and coplanar with said front wall and only allows the mobile panel to move longitudinally.

15. The device as claimed in claim 11, wherein the mobile panel is movable due to gravity, is manually operated and comprises multiple saw teeth outlets; and
    the curved surface of the mobile panel can be "V" shaped or "⊓" shaped.

16. The device as claimed in claim 11, wherein the lower limit board maintains an appropriate space between the mobile panel and the button input panel.

17. The device as claimed in claim 15, wherein the brake is able to lock one or more of the saw teeth outlets of the mobile panel to confine a movement of the curved surface mobile panel.

18. The device as claimed in claim 11, wherein the movement detecting unit detects a movement status of the mobile panel.

19. The device as claimed in claim. 11, wherein the data processing control unit executes tasks of setting, receiving, comparing, analyzing and controlling a password and a sensed signal.

* * * * *